United States Patent

Ikka

[11] Patent Number: 6,034,620
[45] Date of Patent: Mar. 7, 2000

[54] RECEPTION OF A SELECTIVE CALL RADIO SIGNAL BY USING THRESHOLD LEVELS DETECTED IN THE SIGNAL IN CALCULATING OPTIMUM THRESHOLD LEVELS

[75] Inventor: Masahiro Ikka, Kakegawa, Japan

[73] Assignee: NEC Corporation, Tokyo, Japan

[21] Appl. No.: 08/966,257

[22] Filed: Nov. 7, 1997

[30] Foreign Application Priority Data

Nov. 7, 1996 [JP] Japan .................................. 8-294874

[51] Int. Cl.[7] ................................................ G08B 5/22
[52] U.S. Cl. ................... 340/825.44; 375/286; 375/287; 370/310; 370/313
[58] Field of Search .................. 340/825.44, 825.47, 340/825.52, 825.69; 375/286, 287; 455/526, 517, 575, 436, 140; 370/310, 313; 1/1

[56] References Cited

U.S. PATENT DOCUMENTS

| 4,734,694 | 3/1988 | Umetsu et al. | 340/825.44 |
| 5,425,053 | 6/1995 | Matsumoto | 375/287 |
| 5,799,043 | 8/1998 | Chang et al. | 375/286 |
| 5,832,038 | 11/1998 | Carsello | 375/287 X |

FOREIGN PATENT DOCUMENTS

| 60-174550 | 9/1985 | Japan . |
| 8-237314 | 9/1996 | Japan . |
| 9-205466 | 8/1997 | Japan . |
| 9-247219 | 9/1997 | Japan . |

Primary Examiner—Michael Horabik
Assistant Examiner—Anthony A. Asongwed
Attorney, Agent, or Firm—Scully, Scott, Murphy & Presser

[57] ABSTRACT

In a selective call radio receiver for receiving a radio communication signal to produce a communication datum of a multiplicity, such as 256, of levels and an intermittent succession of synchronization patterns, a combination of a pattern detector, a sample memory, and a threshold calculator detects a predetermined number, such as three, of detected threshold levels in each synchronization pattern. A threshold memory stores first to N-th past sets of stored threshold levels, N being equal to two or greater. Based on a current set of the detected threshold levels and the past sets, a threshold comparator generates optimum threshold levels for use in a discriminator for judging the communication datum as a multilevel, such as four-level, receiver output signal. Preferably, operation of the receiver is suspended when the detected threshold levels are abnormal, when the current and the past sets are not spaced apart by a synchronization interval, or when the optimum threshold levels are not within allowable ranges therefor.

17 Claims, 11 Drawing Sheets

RECEPTION OF A SELECTIVE CALL RADIO SIGNAL BY USING THRESHOLD LEVELS DETECTED IN THE SIGNAL IN CALCULATING OPTIMUM THRESHOLD LEVELS

BACKGROUND OF THE INVENTION

This invention relates to a selective call radio receiving method and a selective call radio receiving device for receiving a radio communication signal by using a predetermined number of threshold levels derived from the radio communication signal.

For reception by such a selective call radio receiving device, the radio communication signal is propagated from a base station and includes a synchronization signal periodically and carries a communication datum. The radio communication signal may be an analog signal.

In the manner which will later be described in greater detail, a conventional selective call radio receiving device of this type comprises a receiving arrangement for receiving the radio communication signal to produce a voltage signal. Connected to the receiving arrangement, a detecting arrangement detects in the voltage signal a predetermined number, such as three, of detected threshold levels by discriminating between signal levels of a particular pattern included in the synchronization signal and a data signal which represents the communication datum as a sequence of received codes of a multiplicity, such as 256, of received symbol levels. Responsive to the detected threshold levels, a judging arrangement judges the data signal to produce a multilevel signal, such as a four-level signal. The number of levels of the multilevel signal is equal to one plus the predetermined number. In this manner, the selective call receiving device can reproduce the communication datum carried by the radio communication signal.

The detecting arrangement is inplemented in practice by a discriminator or an A/D converter. Inasmuch as such a signal conversion unit is used in converting the voltage signal primarily to a binary signal in various selective call radio communication devices, selection of parts of the detecting arrangement has been restricted to conversion of the voltage signal to the binary signal. This restriction is unavoidable even if the selection is for a four-level particular pattern for use in calculating three detected threshold levels. Moreover, the detecting arrangement has a conversion characteristic which is inevitably subject to a deviation and, through aging, to a shift. As a result, reproduction of the communication datum has been incorrect.

In order to cope with the shift, a countermeasure has been proposed to calculate a mean value of whole levels of the four-level particular pattern being received and a difference between the mean value and a middle one of the three detected threshold levels. The difference is used in commonly shifting the three detected threshold levels to provide three corrected threshold levels for use in judging the received codes of the communication datum. The proposal is, however, incapable of coping with the deviation.

In addition, the radio communication signal may be distorted either at instants of its propagation from the base station or while transmitted from the base station to the selective call radio receiving device. This inherent distortion of the radio communication signal makes it impossible to correct the detected threshold levels into the corrected threshold levels and results also in a reduced correctness of the reproduction.

SUMMARY OF THE INVENTION

In view of the foregoing, it is an object of the present invention to provide a selective call radio communication method of always correctly judging a multilevel communication datum carried by a radio communication signal in a selective call radio receiving device even when the radio communication signal is received in the selective call radio receiving device with an inherent distortion.

It is another object of this invention to provide a selective call radio receiving method which is of the type described and which can always correctly judge the multilevel communication datum even when the radio communication signal is subjected to a distortion while propagated from a base station to the selective call radio receiving device.

It is still another object of this invention to provide a selective call radio receiving method which is of the type described and which can always correctly judge the multilevel communication datum even when the radio communication signal is detected by a detecting arrangement liable to a deviation and/or a shift.

It is yet another object of this invention to provide a selective call radio communication method which is of the type described and which can always correctly judge the multilevel communication datum even when characteristics of the detecting arrangement are deteriorated by aging.

It is a different object of this invention to provide a selective call radio receiving device for implementing a selective call radio receiving method of the type described.

Other objects of this invention will become clear as the description proceeds.

In accordance with an aspect of this invention, there is provided a selective call radio receiving method comprising the steps of (a) receiving a radio communication signal to produce a voltage signal, (b) detecting in the voltage signal a predetermined number of detected threshold levels and a data signal, and (c) judging responsive to a plurality of optimum threshold levels, equal in number to the detected threshold levels, in the data signal a communication datum carried by the radio communication signal, further comprising the steps of (A) storing the detected threshold levels as stored threshold levels and (B) using the stored threshold levels in calculating the optimum threshold levels.

In accordance with a different aspect of this invention, there is provided a selective call radio receiving device comprising (a) receiving means for receiving a radio communication signal to produce a voltage signal, (b) detecting means for detecting in the voltage signal a predetermined number of detected threshold levels and a data signal, and (c) judging means responsive to a plurality of optimum threshold levels, equal in number to the detected threshold levels, for judging in the data signal a communication datum carried by the radio communication signal, further comprising (A) memory means for storing the detected threshold levels as stored threshold levels and (B) calculating means for using the stored threshold levels in calculating the optimum threshold levels.

DESCRIPTION OF THE PREFERRED EMBODIMENT

Figure 1:
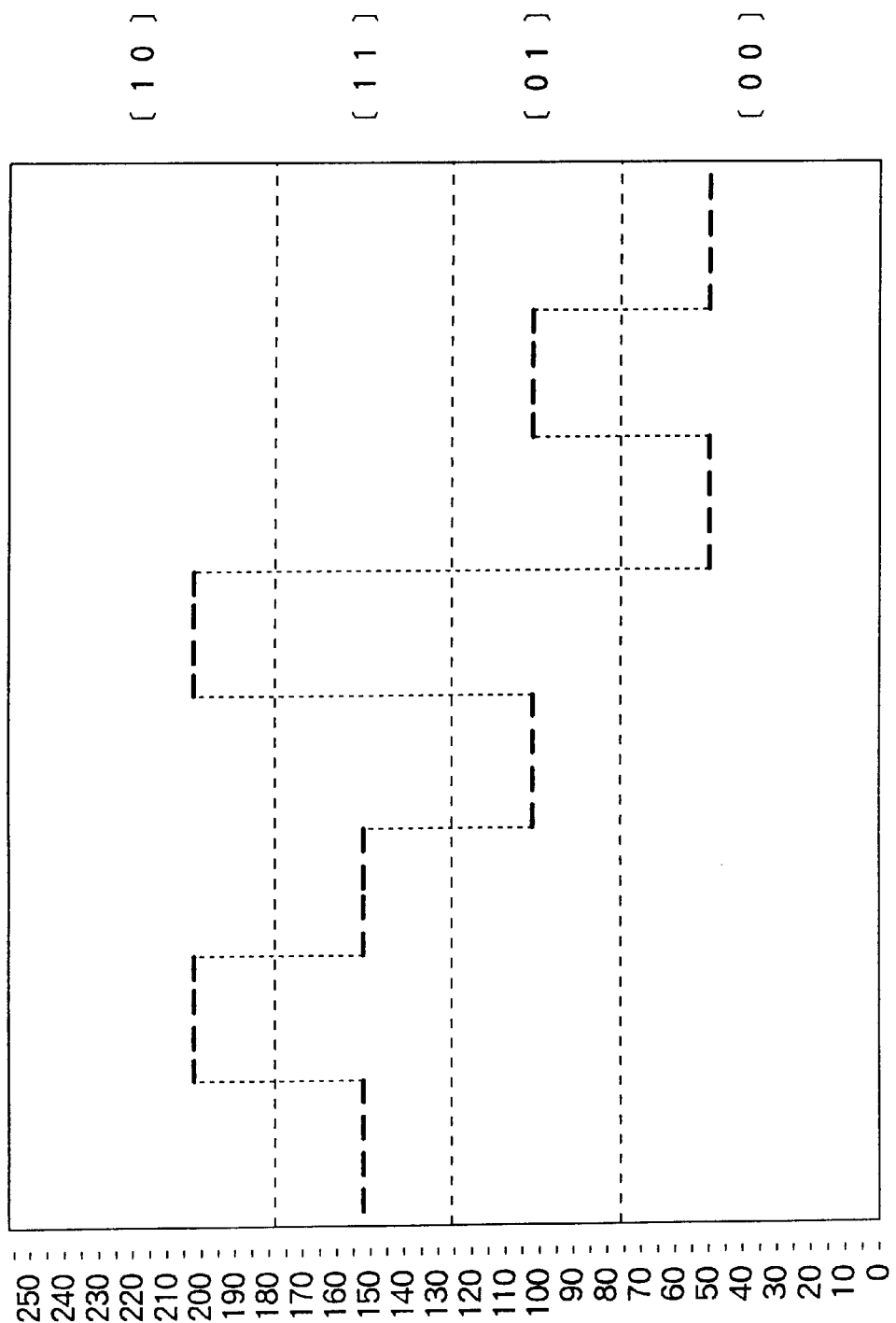
FIG. 1 exemplifies, together with three threshold levels, an ideal signal waveform of a communication datum carried in general by a selective call radio communication signal.

Referring to FIG. 1, a communication datum carried by a selective call radio communication signal will first be described in an ideal state in order to facilitate an understanding of the present invention. The selective call radio communication signal is propagated from a base station of a selective call radio communication network typically as an analog signal and should be received in general by a selective call radio receiving device which is either a portable radio receiver or a mobile radio receiver installed on a mobile vehicle, is assigned with its unique identification number, and comprises preferably a battery having facility.

In the example being illustrated, the communication datum is a succession of symbol codes representative of a content of communication and selectively variable among 256 symbol levels indicated as 0 to 255 levels. It is assumed throughout the description that this multiplicity of symbol levels are discriminated from one another in the receiver as a four-level reception signal variable among first to fourth predetermined levels which are indicated on a right-hand side from top to bottom as [10], [11], [01], and [00]. For this purpose, the receiver uses first to third threshold levels exemplified by three horizontal dashed lines at first to third preselected levels of 179, 128, and 77, respectively.

Figure 2:
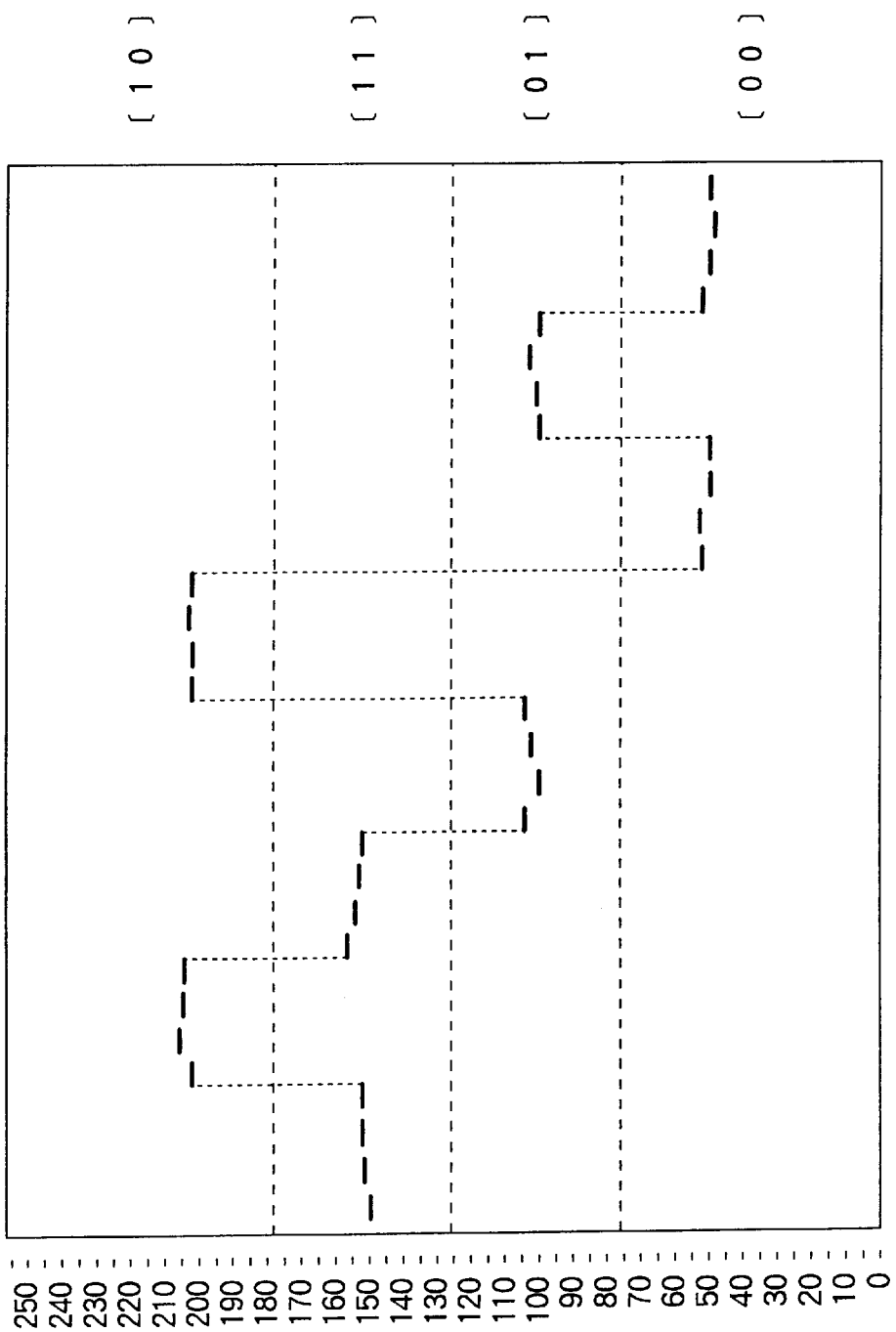
FIG. 2 shows a deviation in the ideal signal waveform exemplified in FIG. 1.

Turning to FIG. 2, the symbol levels may be subjected to a deviation of a few symbol levels from the ideal state by various causes in the manner known in the art. Such various causes may affect the symbol codes at the base station and/or in the receiver. In particular, the deviation is introduced relative to the symbol levels by a fluctuation in characteristics of an arrangement used in the receiver in genera ting the first to the third threshold levels.

Figure 3:
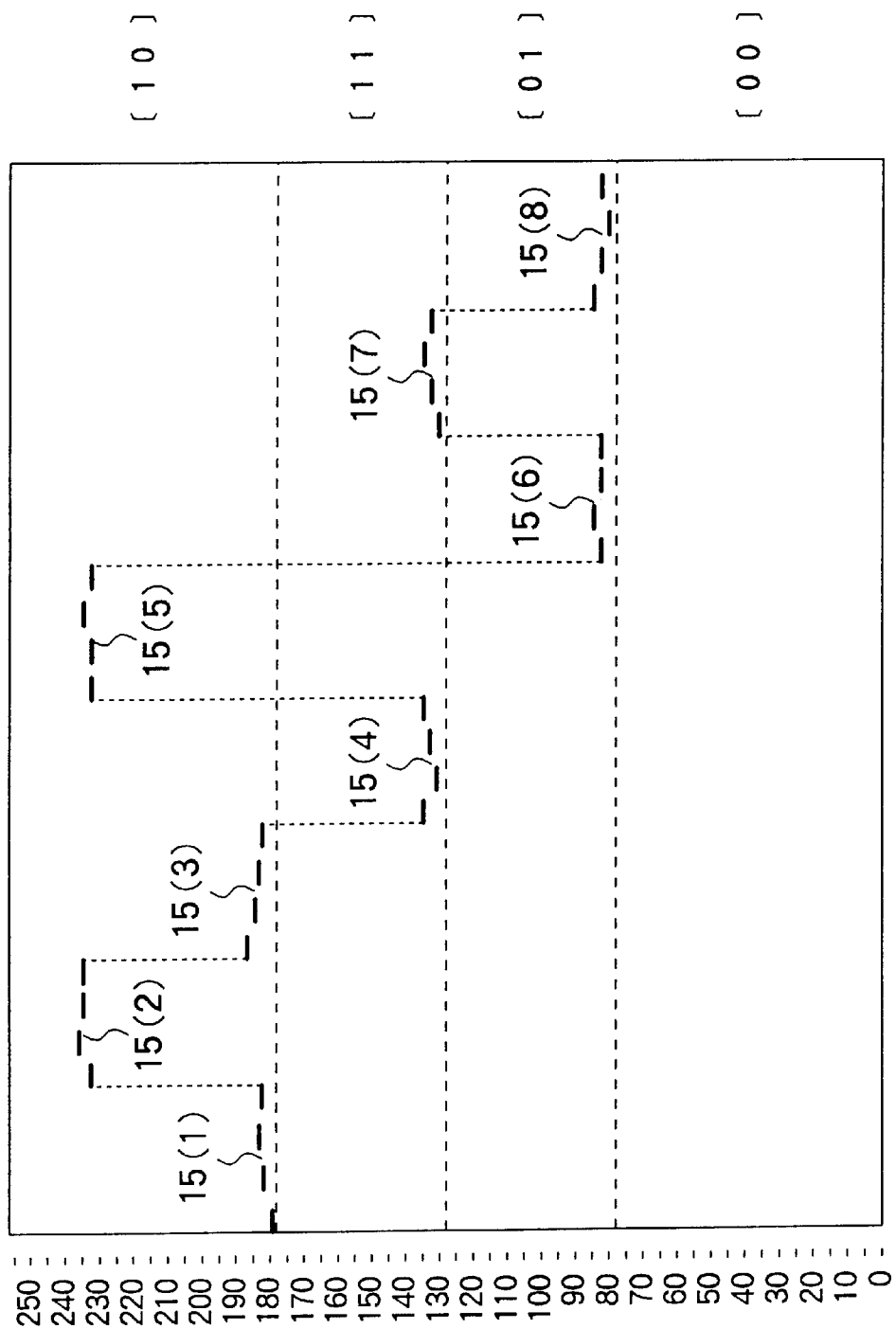
FIG. 3 shows a shift in a signal waveform exemplified in FIG. 2.

Further turning to FIG. 3 with FIG. 2 continuously referred to, an overall shift Is superposed on the deviation as a result of deterioration caused to the characteristics by aging. The symbol codes will now be referred to, from left to right, as first to eighth codes 15(1), 15(2), . . . , and 15(8). The overall shift gives rise to incorrect judgement of the first and the third codes 15(1) and 15(3) to have the first predetermined level [10] rather than the second predetermined level [11] as in FIGS. 1 and 2, the fourth code 15 (4) to have the second predetermined level [11] rather than the third predetermined level [01], and the sixth to the eighth codes 15(6) to 15(8) to have the third, the second, and the third predetermined levels [01], [11], and [01], respectively, instead of the fourth, the third, and the fourth predetermined levels [00], [01], and [00].

Figure 4:
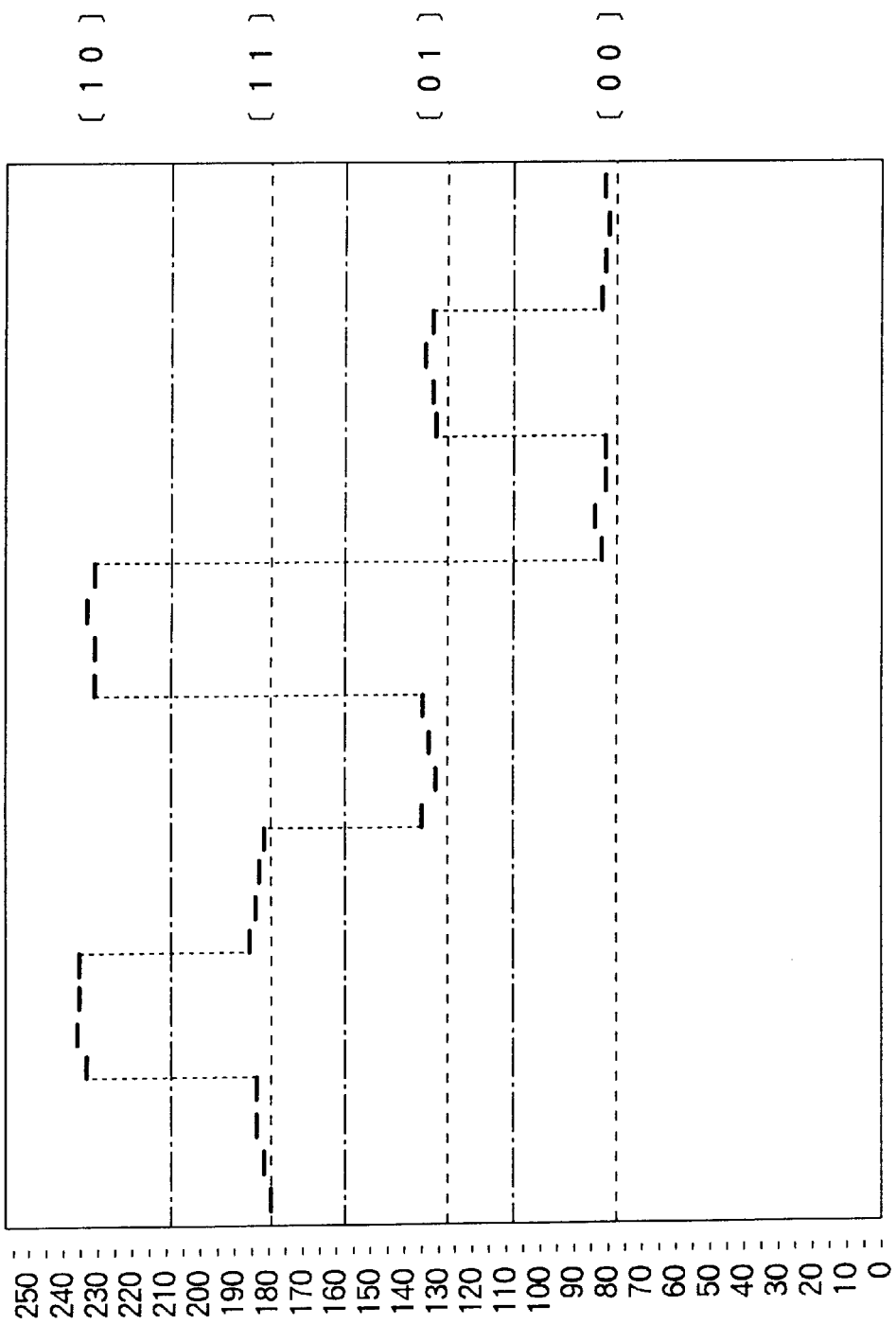
FIG. 4 shows correction effected by a conventional selective call radio receiving method on the shift illustrated in FIG. 3.

Referring afresh to FIG. 4 and continuously to FIGS. 2 and 3, a countermeasure has been known to cope with such an incorrect judgement. According to the countermeasure, an arithmetic mean of the symbol levels being received is calculated. A compensation difference is calculated between the arithmetic mean and a middle one of the first to the third threshold levels, namely, the second threshold level. After generated, the first to the third threshold levels are corrected into first to third compensated levels by algebraically adding thereto the compensation difference. In FIG. 4, the first to the third compensated levels are indicated by horizontal dash-dot lines. This enables correct judgement of the symbol levels for the deviation and the overall shift exemplified above with reference to FIG. 3.

Figure 5:
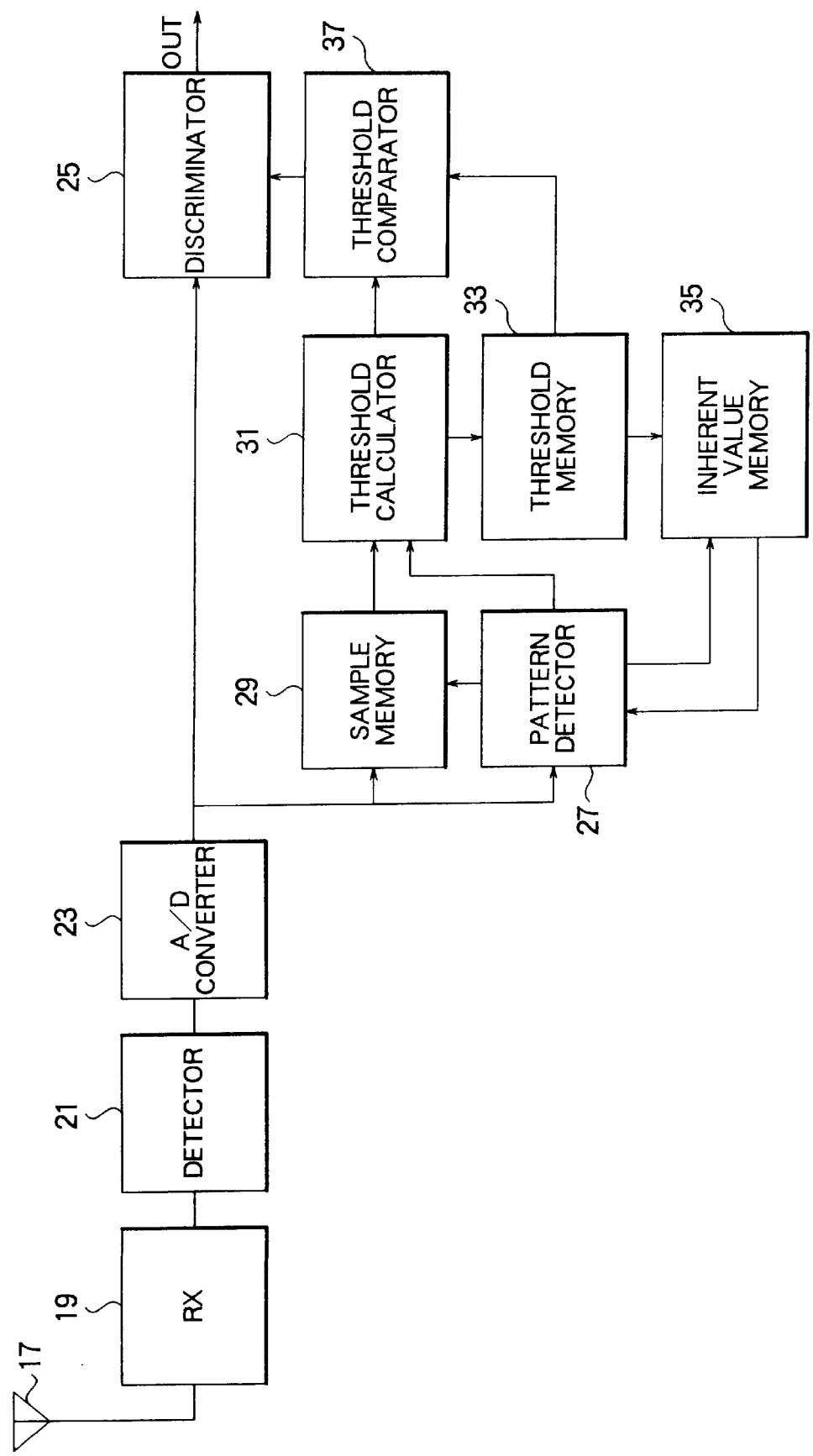
FIG. 5 is a block diagram of a selective call radio receiving device according to an embodiment of the instant invention.

Referring now to FIG. 5, a selectively called radio receiver is according to a preferred embodiment of this invention and is for receiving at a reception antenna 17 the selective call radio signal described in the foregoing in conjunction with FIGS. 1 to 4. Connected to the antenna 17, a receiver part 19 amplifies and converts the selective call radio signal into a converted signal of a frequency, such as an intermediate frequency, which is readily processed in the receiver. In the manner which will presently be described, the selective radio communication signal carries a synchronization signal or pattern and a data signal. The synchronization signal includes, at predetermined instants thereof, respectively, specific codes with a pattern waveform which has first to fourth pattern levels SL1, SL2, SL3, and SL4. In the pattern waveform, each of these four pattern levels appears at least once at one of the predetermined instants. More in detail, the radio communication signal includes an intermittent succession of synchronization patterns at a synchronization interval. Each synchronization pattern comprises a preselected number of pattern levels at successive instants in a duration of the synchronization pattern.

In the converted signal delivered from the receiver part 19, a detector 21 detects the synchronization signal and the data signal collectively as a voltage signal and moreover detects the specific codes in the synchronization signal. Connected to the detector 21, an A/D converter 23 converts the data signal to the communication datum described above, and the specific codes to a plurality of sample values of a value precision which should not adversely affect the pattern waveform of the four pattern levels. Connected to the A/D converter 23 and responsive to a predetermined number of optimum threshold levels generated from the sample values in the manner which will becomes clear as the description proceeds, a discriminator 25 serves as a judging arrangement for judging the symbol levels of the symbol codes in the communication datum to produce the four-level signal as a receiver output signal OUT.

Operation of receiver circuit elements used between the A/D converter 23 and the discriminator 25 will roughly be described during a short while, with the operation presently described more in detail. Connected to the A/D converter 23, a pattern detector 27 monitors the pattern waveform to detect the specific codes as the sample values. Connected to the pattern detector 27, a sample value memory 29 temporarily stores such sample values as stored values. Supplied with the pattern waveform from the pattern detector 27 and with the sample values from the sample value memory 29, a threshold level calculator 31 first reads the four pattern levels SL1 to SL4 and thereafter calculates first to third detected threshold levels TH1, TH2, and TH3, equal in number to the optimum threshold levels. Connected to the threshold calculator 31, a threshold level memory 33 stores the detected threshold levels as stored threshold levels.

It may be mentioned here that the selective call radio communication signal periodically includes a series of synchronization signals at a synchronization interval or period. The threshold level calculator 31 consequently produces the detected threshold levels as an intermittent succession of detected threshold levels. The threshold level memory 33 serves as a memory arrangement for temporarily storing the detected threshold levels of two or more past sets time sequentially detected in the intermittent succession as the stored threshold levels of first to N-th sets of a continuous succession, where N represents a predetermined positive integer which is equal to two or greater. The pattern detector 27 additionally picks up the synchronization interval. Connected to the pattern detector 27 and the threshold level memory 33, an inherent value memory 35 stores a predetermined interval for supply to the threshold level memory 33 as a threshold level correcting interval. In addition, the prescribed number N is preliminarily stored in the inherent value memory 35 for delivery to the threshold level memory 33 so as to specify that number of sets of stored threshold levels which should be used in the threshold level memory 33 as the first to the N-th sets.

The threshold level calculator 31 is connected furthermore to a threshold level comparator 37 for delivery of the detected threshold levels as a current set of the detected threshold levels. Similarly, the threshold level memory 33 is connected to the threshold level comparator 37 to supply at the threshold level correcting interval the stored threshold levels as the first to the N-th past sets of stored threshold levels successively past a current time to an N-th prior time which is N threshold level correcting intervals earlier. Connected to the discriminator 25, the threshold level comparator 37 compares the current set collectively with the first to the N-th past sets to supply the discriminator 25 with the current threshold levels as the optimum threshold levels with a comparison delay of N synchronization intervals if the current threshold levels are discrepant with none of the stored threshold levels of the first to the N-th sets. It is possible to preliminarily store a plurality of built-in device threshold levels, equal in number to the optimum threshold levels, in the discriminator 25 and to renew the device threshold levels to the optimum threshold levels generated by the threshold level comparator 37.

Figure 6:
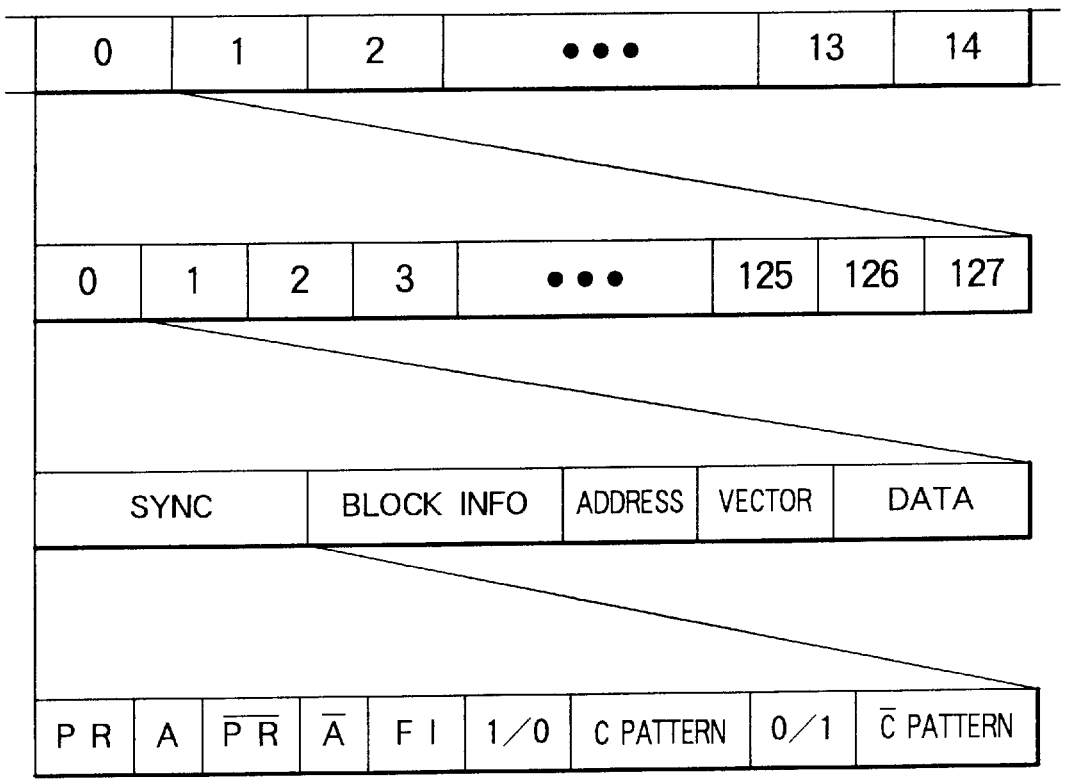
FIG. 6 shows a signal format of the radio communication signal mentioned in conjunction with FIG. 1.

Turning to FIG. 6, the selective call radio communication signal carries the intermittent succession of synchronization signals and the communication datum in the manner exemplified in the following. It is presumed that the selective call radio communication signal is propagated in a format known as the FLEX format.

In the manner depicted along a first or top row in FIG. 6, the selective radio communication signal is propagated as a continuous succession of cycles, such as zeroth, first, second, and like cycles. Along a second row, the zeroth cycle consists of zeroth to 127-th frames. Along a third row, the zeroth frame consists of a synchronization field SYNC for each synchronization signal, a block information field BLOCK INFO, an address field, a vector field, and a data field. The synchronization signals are included in the first, the second, and successively following frames. The synchronization interval is equal in this event to a frame period. The data fields of such frames collectively provide the communication datum. Along a fourth or bottom row, the synchronization signal comprises a first bit section of a first bit rate of 1,600 bps and a second bit section of one of 1,600, 3,200, and 6,400 bps. In the first bit section, sequentially arranged are PR, A, $\overline{PR}$, $\overline{A}$, and frame information (FI) areas. In the second bit section, consecutively arranged are 1/0, C pattern, now 0/1, and $\overline{C}$ pattern areas.

Figure 7:
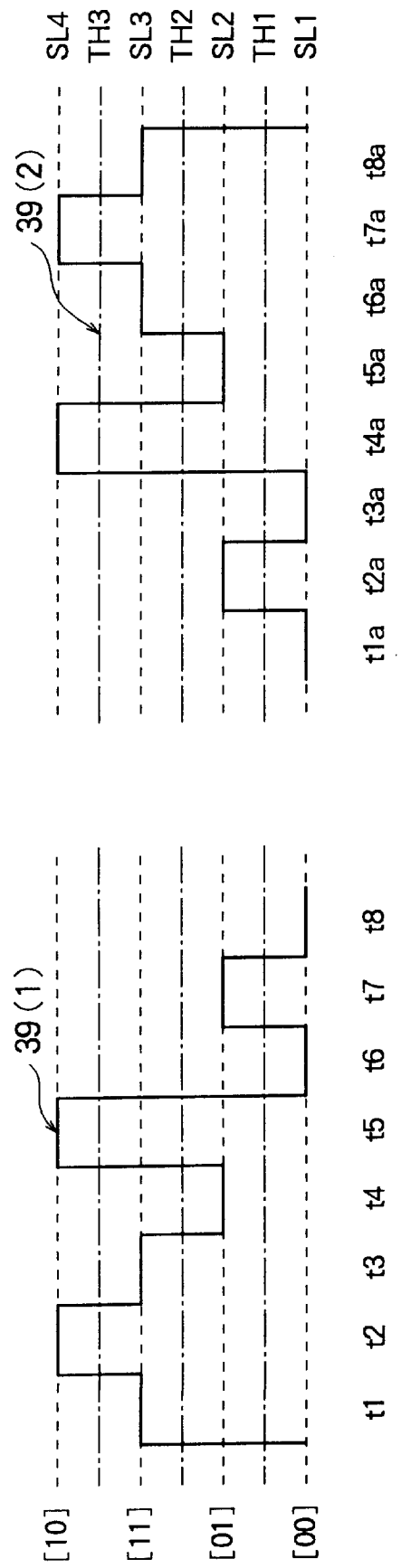
FIG. 7 exemplifies specific patterns in the signal format depicted in FIG. 6.

Further turning to FIG. 7, the C and the $\overline{C}$ pattern areas are exemplified as first and second pattern parts 39(1) and 39(2), respectively. Four horizontal dashed lines indicate the first to the fourth predetermined levels [10], [11], [01], and [00] described in conjunction with FIG. 1. Three horizontal dash-dot lines indicate from bottom to top the first to the third detected threshold levels TH1 to TH3. The predetermined instants, described in connection with the receiver part 19 of FIG. 5, are indicated below the fourth predetermined level [00] as first to eighth primary instants t1, t2, ..., and t8 and as first to eighth secondary instants t1a, t2a, ..., and t8a. The first pattern part 39(1) has, for example, the second predetermined level [11] twice at the first and the third primary instants t1 and t3. The second pattern part 39(2) has the second predetermined level also twice at the sixth and the eighth secondary instants t6a and t8a. Comparing FIG. 7 and FIG. 1, it is understood that the pattern waveform of the first pattern part 39(1) happens to have the symbol levels of the first to the eighth codes 15(1) to 15(8) exemplified in FIG. 3. In FIG. 5, the threshold level calculator 31 first reads the first and the second pattern parts 39(1) and 39(2) to provide the four pattern levels SL1 to SL4 as indicated in FIG. 7 and then calculates the first to the third detected threshold levels TH1 to TH3, each by a mean value of two adjacent ones of the four pattern levels.

Referring afresh to FIG. 8 and again FIGS. 5 to 7, the selective call radio receiver is operable as follows. After START of operation, the detector 21 produces at a first step ST1 the data signal and, above all, the synchronization signals at the synchronization interval. At a second step ST2, the pattern detector 27 checks in the synchronization field of FIG. 6 whether the frame information area FI indicates a binary signal or a four-level signal. If the binary signal is indicated, the synchronization signal should be processed at a third step ST3 in a usual receiver rather than in the selective call radio receiver being illustrated. The third step ST3 is therefore depicted lowermost and will not be described any further.

The pattern detector 27 picks up the synchronization interval furthermore at the second step ST2. It may be mentioned here that a predetermined time interval may preliminarily be stored in the inherent value memory 35 as the threshold level correcting interval. In this event, the pattern detector 27 checks at the second step ST2 whether or not the synchronization interval is coincident with the predetermined time interval. If incoincident, the second step ST2 suspends operation of the selective call radio receiver. This fact is represented by a jump from the second step ST2 to the third step ST3.

If the frame information area FI indicates the four-level signal at the second step ST2 and furthermore if the synchronization interval is coincident with the predetermined time interval, the second step ST2 proceeds to a fourth step ST4 at which the pattern detector 27 estimates, based on the frame information area FI, time instants of production of the first and the second pattern parts 39(1) and 39(2) from the A/D converter 23, detects the specific codes to store them as the stored values in the sample value memory 29 so that their signal levels may not be deteriorated. When the sample values are stored in the sample value memory 29, the threshold level calculator 31 detects at a fifth step ST5 the four pattern levels [00], [01], [11], and [10] or SL1 to SL4 of the stored values and the sample values being currently detected. Immediately thereafter, the threshold level calculator 31 checks at a sixth step ST6 whether or not the four pattern levels are discrepant within themselves.

Figure 8:
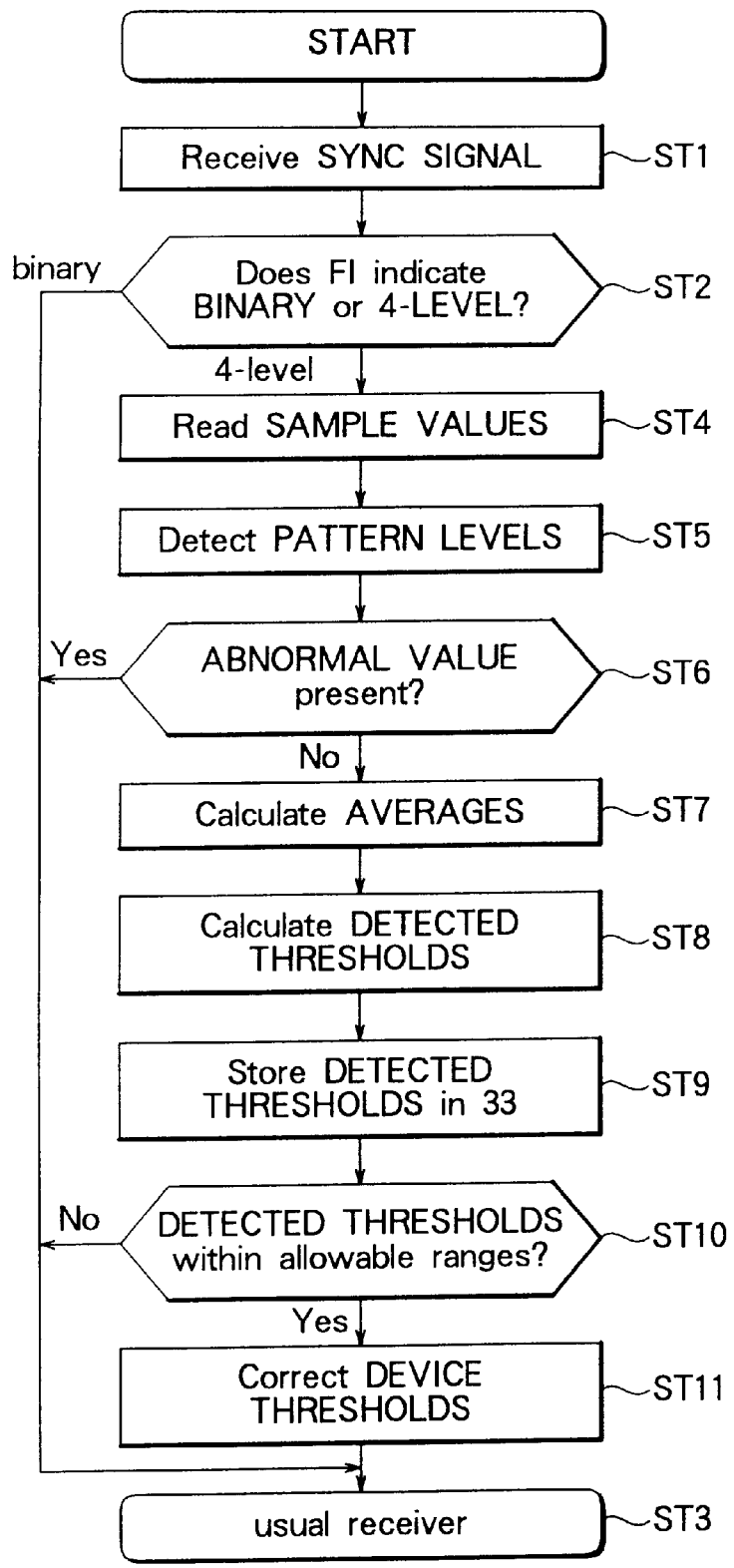
FIG. 8 shows a flow chart for use in describing operation of the selective call radio receiving device illustrated in FIG. 5.

More particularly, the four pattern levels are in the example illustrated in FIG. 7 the fourth predetermined level at the instants t6, t8, t1a, and t3a, the third predetermined level at the instants t4, t7, t2a, and t5a, the second predetermined level at the instants t1, t3, t6a, and t8a, and the first predetermined level at the instants t2, t5, t4a, and t7a. Even when such predetermined levels may be influenced by the deviation described in conjunction with FIG. 2, their maxima and minima would not be superposed on one another. The threshold level calculator 31 therefore checks such a superposition first at the sixth step ST6. If the selective call radio communication signal is subjected to the overall shift described in connection with FIG. 3, a level difference would become greater than a quarter of a whole level range of the communication datum, namely, sixty-four levels, between a minimum of one of the four predetermined levels and a maximum of a next lower one of the four predetermined levels. The threshold level calculator 31 consequently checks secondly at the sixth step ST6 whether or not such an abnormal value is present in the first to the fourth pattern levels SL1 to SL4. In an affirmative case, the receiver of FIG. 5 suspends its operation. This is depicted in FIG. 8 by a jump of the sixth step ST6 to the third step ST3.

If neither the discrepancy nor the abnormal value is found at the sixth step ST6, the threshold level calculator 31 calculates at a seventh step ST7 three averages between consecutive two of the first to the fourth pattern levels as the first to the third detected threshold levels TH1 to TH3 as indicated at an eighth step ST8 and to store at a ninth step ST9 such detected threshold levels in the threshold level memory 33 as stored threshold levels.

Figure 9:
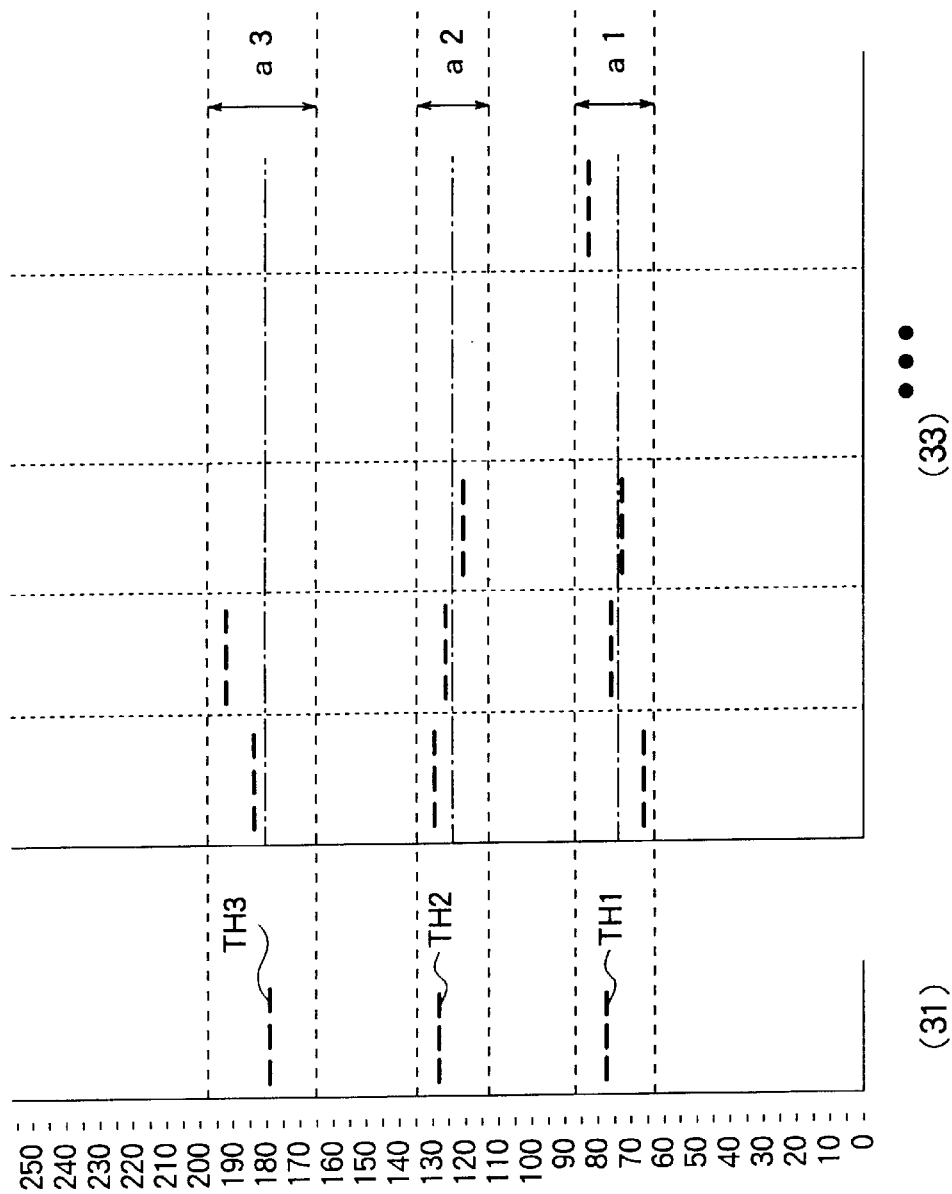
FIG. 9 shows operation of a threshold level comparator preferred for use in the selective call radio receiving device illustrated in FIG. 5.

Turning to FIG. 9 during a short while with FIG. 5 continuously referred to, the threshold level calculator 31 delivers the first to the third detected threshold levels TH1 to TH3 to the threshold level comparator 37 as the current threshold levels, which are depicted on a left-hand side at (31) with their durations slightly shortened. In response, the threshold level comparator 37 reads from the threshold level memory 33 successively the first to the N-th past sets of the stored threshold levels which are exemplified on a right-hand side at (33) with the first, the second, the third, . . . , and the N-th past sets of stored threshold levels segmented by five vertical dotted lines as regards each time sequential set of such stored threshold levels. Thereafter, the threshold level comparator 37 calculates an average level and a variance thereof in connection with each of the first to the third stored threshold levels. It is surmised that such average levels with their variances define first to third allowance level ranges a1, a2, and a3 for the first to the third detected threshold levels TH1, TH2, and TH3, respectively.

Turning back to FIG. 8 and also to FIG. 5 with FIG. 9 continuously referred to, the threshold level comparator 37 checks at a tenth step ST10 whether or not the detected threshold levels of the current set are within the first to the third allowable level ranges, respectively. In a negative case, the receiver of FIG. 5 suspends correction of the device threshold levels. This is because the selective call radio sigal would have been subjected to spontaneous deviation and/or shift. It is incidentally possible to make the threshold level comparator 37 serve as a threshold level calculating arrangement responsive to the stored threshold levels for calculating the optimum threshold levels by using the average levels and their variances. If the "optimum" threshold levels are outwardly of the allowable level ranges, operation of the threshold level calculating arrangement 31 or of the selective call radio receiver is suspended during several synchronization intervals. This is indicated again by a jump from the tenth step ST 10 to the third step ST3. If the "optimum" threshold levels are contrarily within the allowance level ranges at the tenth step ST10, these threshold levels are substituted at an eleventh step ST11 for the device threshold levels used in the discriminator 25. The optimum threshold levels are used in this manner. This is indicated by a progress of the eleventh step ST11 to the third step ST3.

Figure 10:
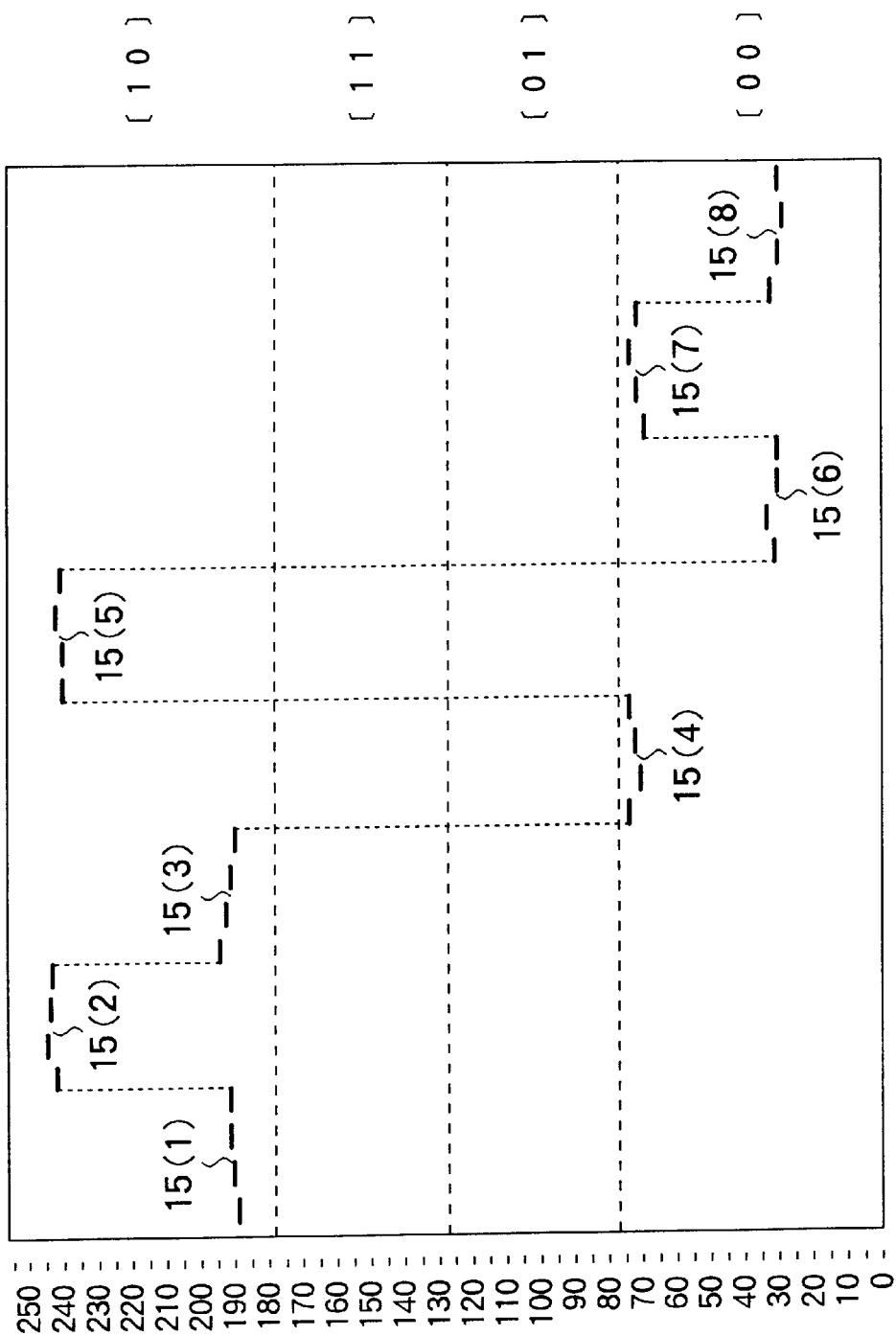
FIG. 10 exemplifies an abnormal shift in the signal waveform exemplified in FIG. 2.

Referring to FIG. 10, illustrated in the ideal signal waveform of FIG. 1 are a deviation like in FIG. 2 and an abnormal shift which is similar to the overall shift described in conjunction with FIG. 3. The abnormal shift is present at the fourth and the fifth codes 15(4) and 15(5) relative to other of the symbol codes.

Figure 11:
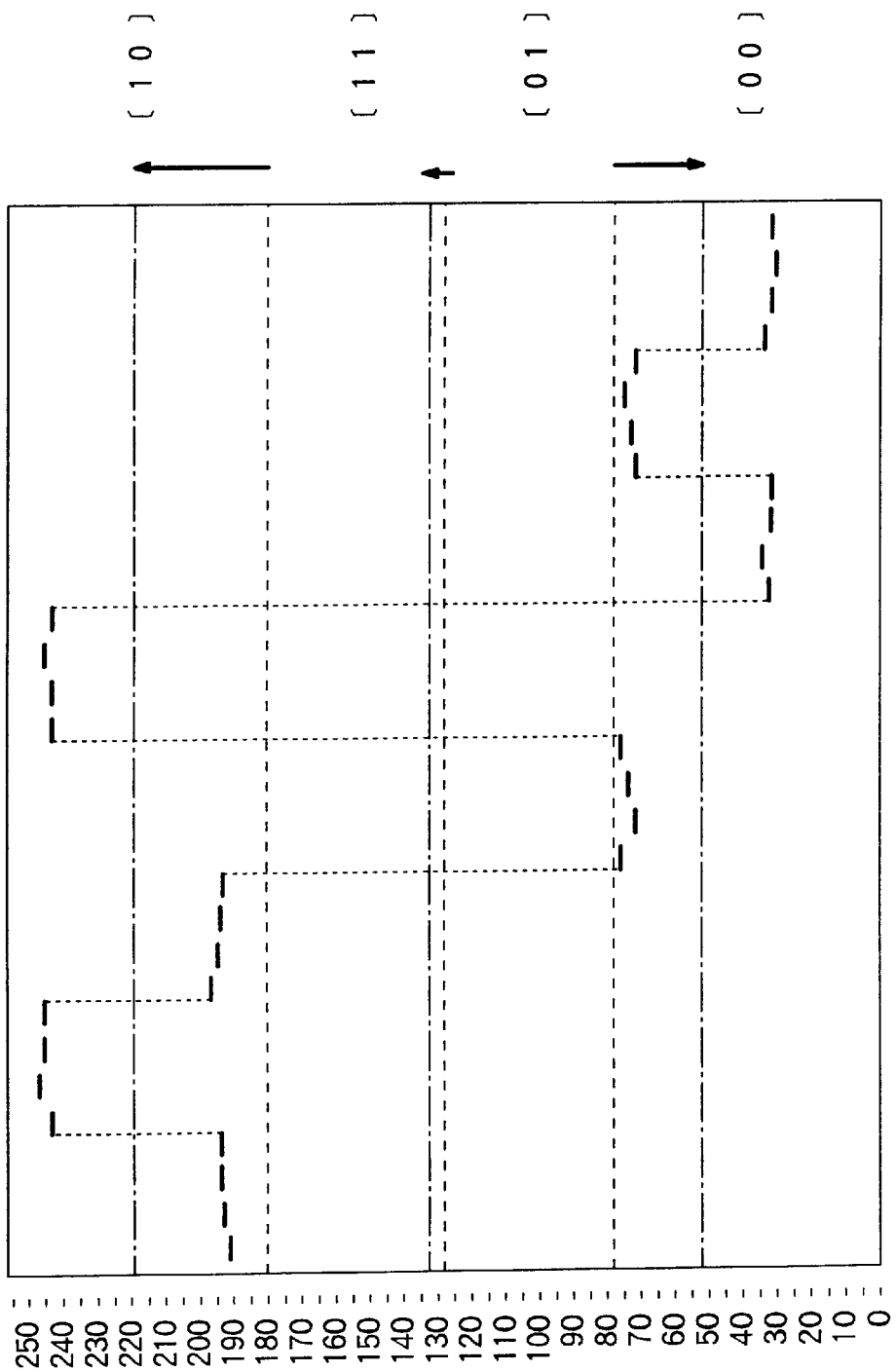
FIG. 11 shows operation of the selective call radio receiving device of FIG. 5 in connection with the abnormal shift exemplified in FIG. 10.

Turning to FIG. 11 with FIGS. 5 and 8 to 10 once more referred to, the first to the third detected threshold levels TH1 to TH3 are indicated with no legends by the three horizontal dashed lines. The threshold level comparator 37 decides first to third corrections as indicated by three vertical arrows for use in correcting the first to the third detected threshold levels, respectively, to provide the optimum threshold levels illustrated by three horizontal dash-dot lines which were used in FIG. 4 in representing the first to the third compensated levels.

It is now understood that this invention can cope with not only the distortion, the deviation, the shift, and the deterioration but also a spontaneous or sudden shift caused either in only a part of the selective call radio signal or temporarily in the characteristics of the receiver circuit element or elements. The synchronization patterns may be represented by a 4FSK modulated signal. While operation of the receiver of this invention has been described with reference to FIG. 8 with an assumption such that the radio communication signal has the format described with particular reference to FIGS. 6 and 7, it should be clearly understood that this receiver is operable even when the radio communication signal is according to a format other than that of the FLEX signal.

What is claimed is:

1. A selective call radio receiving method comprising the steps of:
   a. receiving a radio communication signal to produce a voltage signal which includes an intermittent succession of at least one synchronization pattern at a synchronization interval;
   b. detecting in said voltage signal a set of a predetermined number of detected threshold levels in each synchronization pattern and a data signal;
   c. storing in a memory said detected threshold levels in first to N-th sets of stored threshold levels in time sequentially detected past sets of the detected threshold levels when a current set of said detected threshold levels is detected in a current synchronization pattern, where N represents an integer of two or greater;
   d. using said current set of detected threshold levels and said first to N-th sets of stored threshold levels to calculate a plurality of optimum threshold levels equal in number to said predetermined number of detected threshold levels;
   e. judging, responsive to said plurality of optimum threshold levels, in said data signal a communication datum carried by said radio communication signal.

2. A selective call radio receiving method as claimed in claim 1, said voltage signal including an intermittent succession of synchronization patterns, each comprising a preselected number of pattern levels, wherein:

said detecting step detects said pattern levels as sample values, respectively, and a set of said detected threshold levels in said sample values;

said storing step stores, as first to N-th sets of said stored threshold levels, time sequentially detected past sets of the detected threshold levels when a current set of said detected threshold levels is detected in one of said synchronization patterns, where N represents an integer not less than two;

said using step using said current set of detected threshold levels and said first to said N-th sets of stored threshold levels in calculating said optimum threshold levels.

3. A selective call radio receiving method as claimed in claim 2, further comprising the step of suspending operation of said selective call radio receiving method when at least one of said sample values is abnormal.

4. A selective call radio receiving method as claimed in claim 1, said judging step using a plurality of device threshold levels, equal in number to said detected threshold levels, in judging said communication datum in said data signal, further comprising the step of substituting said optimum threshold levels for said device threshold levels when said device threshold levels are at least partly different from said optimum threshold levels.

5. A selective call radio receiving device comprising:

a. receiving means for receiving a radio communication signal to produce a voltage signal which includes an intermittent succession of at least one synchronization pattern at a synchronization interval;

b. detecting means for detecting in said voltage signal a set of a predetermined number of detected threshold levels in each synchronization pattern and a data signal;

c. memory means for storing, as first to N-th sets of stored threshold levels, time sequentially detected past sets of the detected threshold levels when a current set of said detected threshold levels is detected in a current synchronization pattern, where N represents an integer of two or greater;

d. calculating means for using said current set of detected threshold levels and said first to N-th sets of stored threshold levels in calculating a plurality of optimum threshold levels equal in number to said predetermined number of detected threshold levels; and e. judging means, responsive to said plurality of optimum threshold levels, for judging in said data signal a communication datum carried by said radio communication signal.

6. A selective call radio receiving device as claimed in claim 5, wherein said memory means is accompanied by suspending means for suspending operation of said selective call radio receiving device when two of said past sets of the detected threshold levels are detected with a time interval which is not equal to said synchronization interval.

7. A selective call radio receiving device as claimed in claim 6, further comprising inherent value memory means for storing a predetermined time interval and a predetermined integer, said suspending means using said predetermined time interval as said synchronization interval, said memory means using said predetermined integer in deciding the number of the sets of said stored threshold levels.

8. A selective call radio receiving device as claimed in claim 5, said judging means using a plurality of preliminarily built-in device threshold levels, equal in number to said detected threshold levels, in judging said communication datum in said voltage signal, further comprising substituting means for substituting said optimum threshold levels for said device threshold levels when said device threshold levels are at least partly different from said optimum threshold levels.

9. A selective call radio receiving device as claimed in claim 5, each of said synchronization patterns having first to fourth instantaneous levels at successive time instants, wherein:

said detecting means produces the detected threshold levels in each of said current and said past sets with first to third individual levels dependent on said first to said fourth instantaneous levels;

said calculating means being further for calculating first to third average level of the first to the third individual levels, respectively, of the stored threshold levels of said first to said N-th sets and first to third variances of said first to said third average levels to define first to third allowable ranges and for suspending operation of said selective call radio receiving device if at least one of the first to the third individual levels of the detected threshold levels of said current set is not within one of said first to said third allowable ranges.

10. A selective call radio receiving device as claimed in claim 5, said voltage signal including an intermittent succession of synchronization patterns at a synchronization interval, each synchronization pattern comprising a preselected number of pattern levels, wherein:

said detecting means detects said pattern levels as sample values, respectively, and a set of said detected threshold levels in said sample values;

said memory means storing, as first to N-th sets of said stored threshold levels, time sequentially detected past sets of the detected threshold levels when a current set of said detected threshold level is detected in one of said synchronization patterns, where N represents an integer not less than two;

said calculating means using said current set of detected threshold levels and said first to said N-th sets of stored threshold levels in calculating said optimum threshold levels.

11. A selective call radio receiving device as claimed in claim 10, wherein said memory means is accompanied by suspending means for suspending operation of said selective call radio receiving device when two of said past sets of the detected threshold levels are detected at a time interval which is not equal to said synchronization interval.

12. A selective call radio receiving device as claimed in claim 11, further comprising inherent value memory means for storing a predetermined time interval and a predetermined integer, said suspending means using said predetermined time interval as said synchronization interval, said memory means using said predetermined integer in deciding said N-th set of stored threshold levels.

13. A selective call radio receiving device as claimed in claim 10, said pattern levels having first to fourth instantaneous levels at successive instants in a duration of each of said synchronization patterns, wherein:

said detecting means produces the detected threshold levels in each of said current and said past sets with first to third individual levels dependent on said first to said fourth instantaneous levels;

said calculating means being further for calculating first to third average levels of the first to the third individual levels, respectively, of the stored threshold levels of said first to said N-th sets and first to third variances of said first to said third average levels to define first to third allowable ranges and for suspending operation of said selective call radio receiving device if at least one of the first to the third individual levels of the detected threshold levels of said current set is not within one of said first to said third allowable ranges.

14. A selective call radio receiving device as claimed in claim 10, said pattern levels having first to fourth instantaneous levels at successive instants in a duration of each of said synchronization patterns, wherein said detecting means comprises:

a pattern detector for detecting the pattern levels of each of said synchronization patterns as sample values, respectively;

a sample memory for temporarily storing as stored values the sample values detected in at least two of said synchronization patterns; and a threshold level calculator for calculating the detected threshold levels of said current set by reading said first to said fourth instantaneous levels of the sample values currently detected and the detected threshold levels of said past sets by reading said first to said fourth instantaneous levels of said stored values said past sets of detected threshold levels in said memory means as said first to said N-th sets of stored threshold levels.

15. A selective call radio receiving device as claimed in claim 14, wherein said threshold level calculator is further for suspending operation of said selective call radio receiving device when the detected threshold levels currently calculated are discrepant from one another.

16. A selective call radio receiving device as claimed in claim 14, wherein said threshold level calculator is further for suspending operation of said selective call radio receiving device when at least two of the detected threshold levels being calculated are discrepant from each other.

17. A selective call radio receiving device as claimed in claim 10, said judging means using a plurality of preliminarily built-in device threshold levels, equal in number to said detected threshold levels, in judging said communication datum in said voltage singal, further comprising substituting means for substituting said optimum levels for said device threshold levels when said device threshold levels are at least partly different from said optimum threshold levels.

\* \* \* \* \*